A. C. REMINGTON.
APPARATUS FOR PRINTING AND TESTING CINEMATOGRAPH FILMS.
APPLICATION FILED DEC. 22, 1915.
1,287,436.
Patented Dec. 10, 1918.
5 SHEETS—SHEET 3.
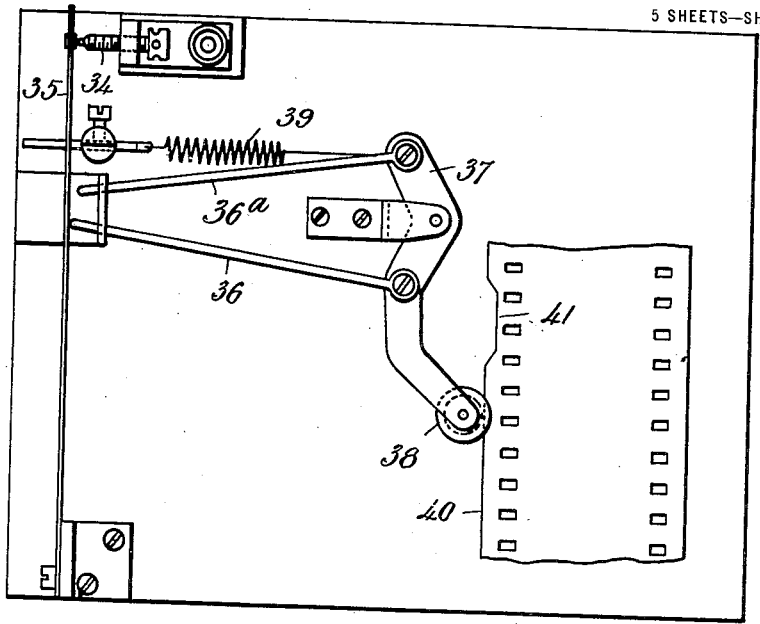
Fig. 7.
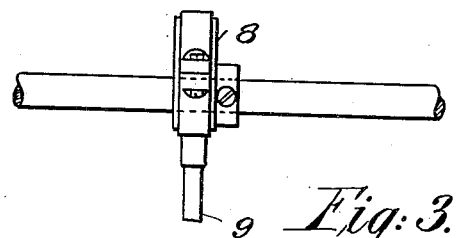
Fig. 3.
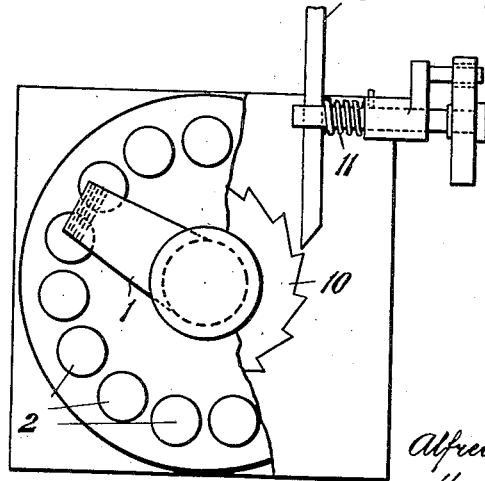
INVENTOR
Alfred Cecil Remington
per. Herbert Sefton Jones
Attorney A. C. REMINGTON.
APPARATUS FOR PRINTING AND TESTING CINEMATOGRAPH FILMS.
APPLICATION FILED DEC. 22, 1915.

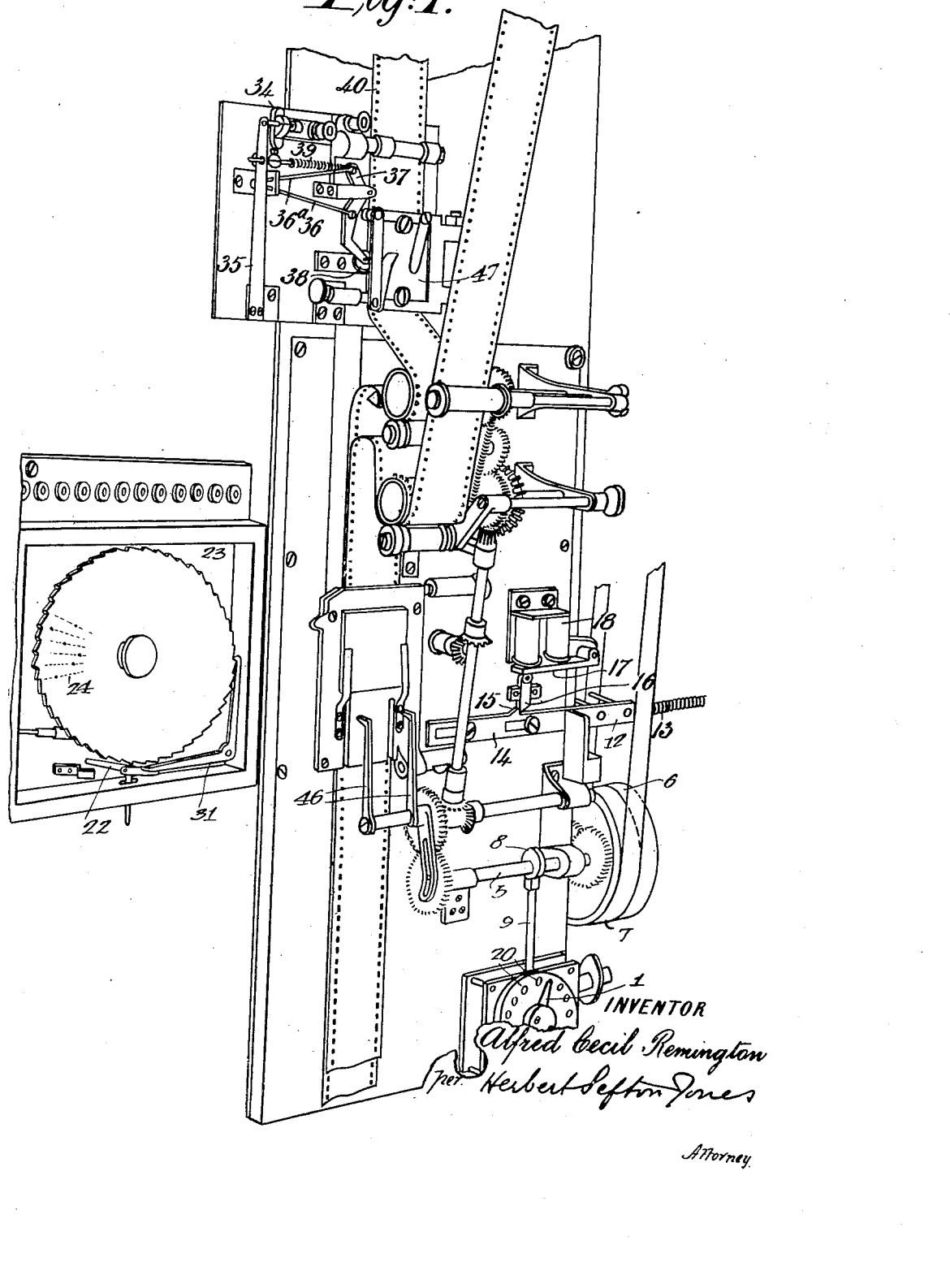

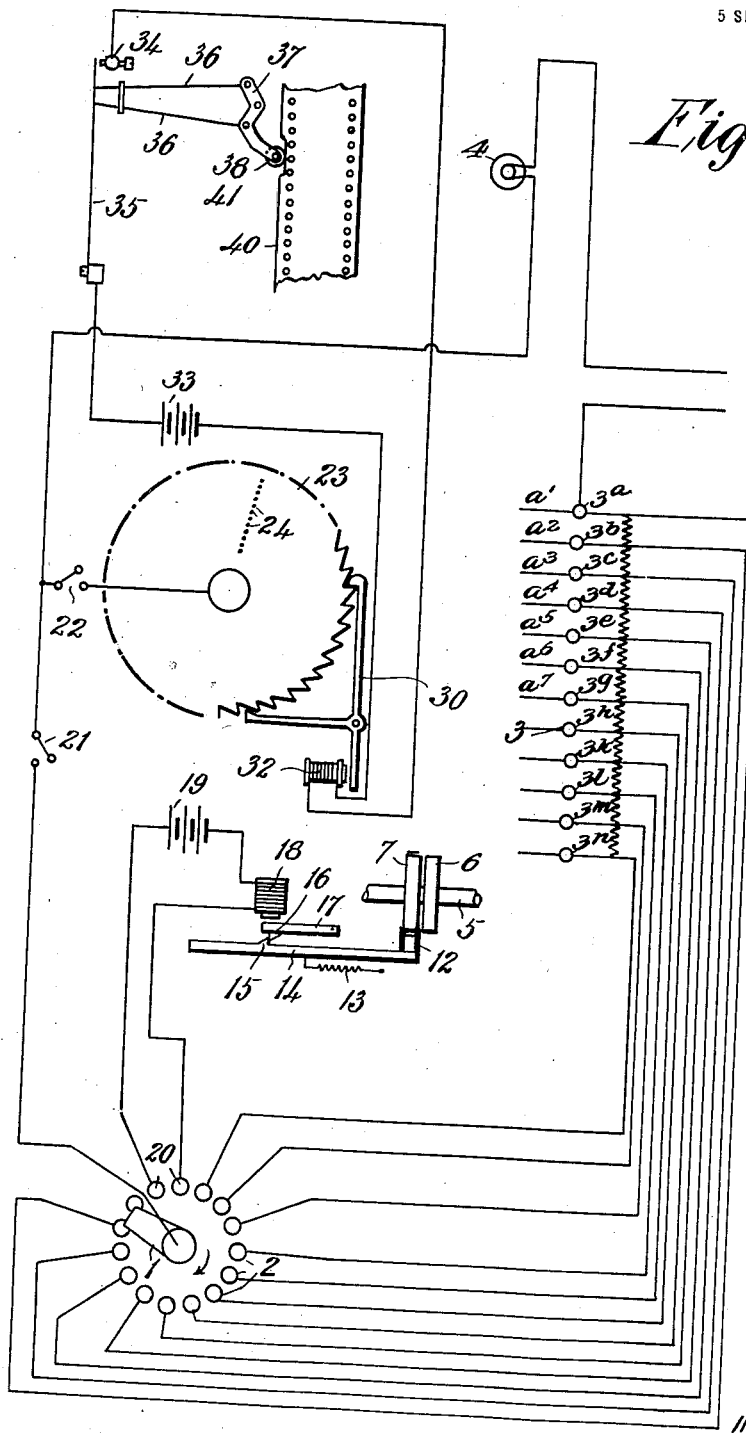

1,287,436.

Patented Dec. 10, 1918.
5 SHEETS—SHEET 4.

INVENTOR
Alfred Cecil Remington
per Herbert Sefton Jones
Attorney

A. C. REMINGTON.
APPARATUS FOR PRINTING AND TESTING CINEMATOGRAPH FILMS.
APPLICATION FILED DEC. 22, 1915.
1,287,436.
Patented Dec. 10, 1918.
5 SHEETS—SHEET 5.
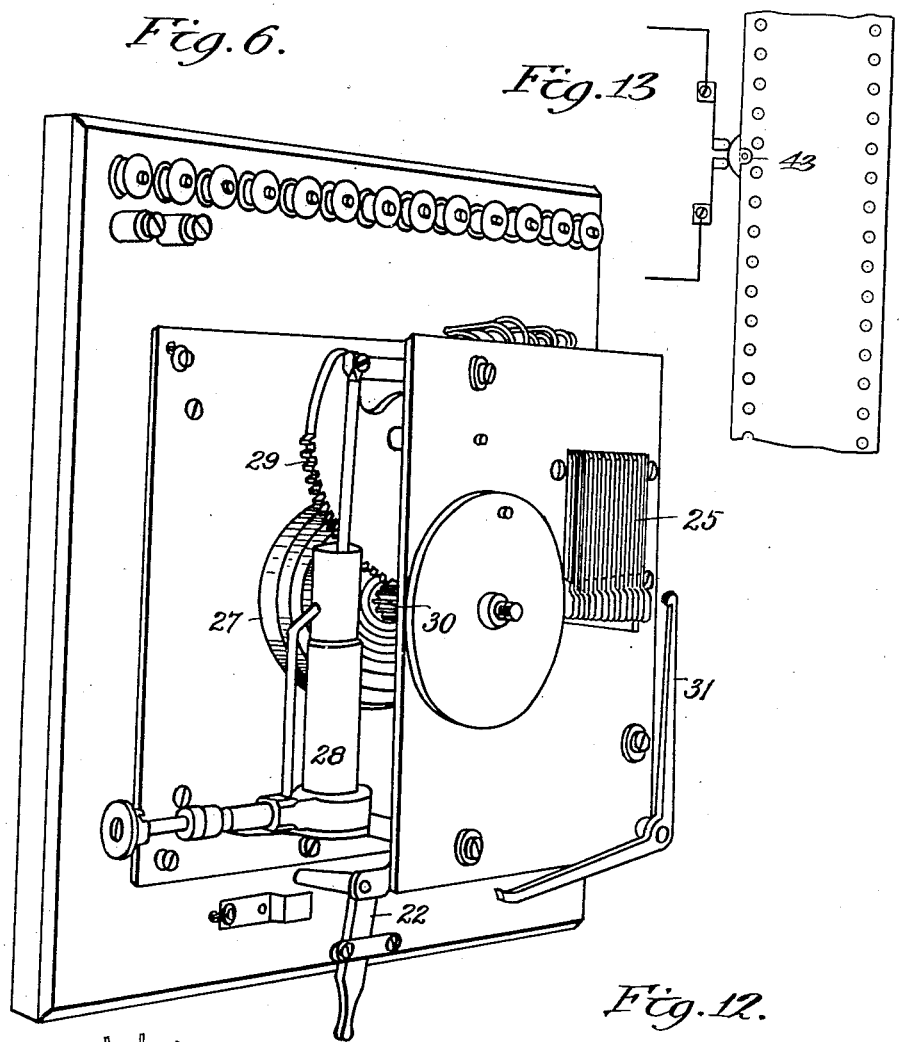
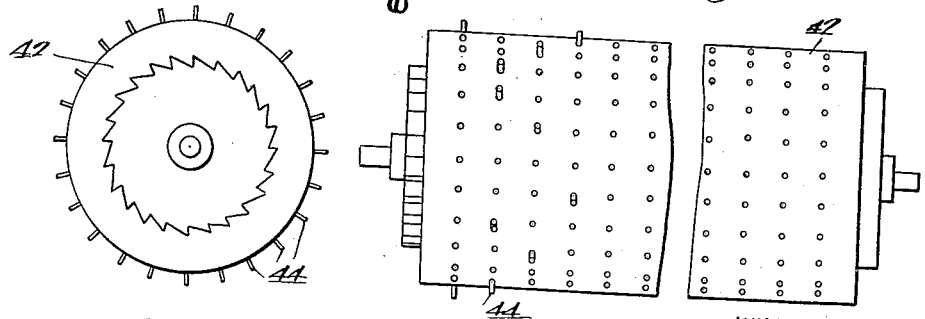

UNITED STATES PATENT OFFICE.

ALFRED C. REMINGTON, OF RICHMOND, ENGLAND, ASSIGNOR OF ONE-HALF TO RALPH DEWSBURY, OF ST. MARGARETS, ENGLAND.

APPARATUS FOR PRINTING AND TESTING CINEMATOGRAPH-FILMS.

1,287,436.

Specification of Letters Patent. Patented Dec. 10, 1918.

Application filed December 22, 1915. Serial No. 68,297.

*To all whom it may concern:*

Be it known that I, ALFRED CECIL REMINGTON, a subject of the King of Great Britain, residing at 4 Old Palace Lane, Richmond, in the county of Surrey, England, have invented new and useful Improvements in Apparatus for Printing and Testing Cinematograph-Films, of which the following is a specification.

The present invention relates to the manufacture of films and like positives particularly for cinematograph display. In practice a number of positive films are printed from a single negative film which latter is often made up of different sections varying considerably in density.

It is obviously necessary to give different exposures to sections of different desity in making a satisfactory positive film. Hitherto this has been largely a matter of guesswork requiring expert treatment, and there has been no guarantee that of a number of positives made from one negative any two will of necessity be substantially identical.

The main purpose of the present invention is to enable any number of positive films to be produced from a negative consisting of different portions of different densities, all of the positives being substantially identical.

One object of the invention is an apparatus for printing from a negative film of varying density, which apparatus insures that each section of the film shall receive exactly the same exposure when making all the positive films from it. Another main object of the invention comprises apparatus for testing each section of film in respect to its density, with a view to determining the best exposure to be used when printing that section of film.

In brief, therefore, the present invention provides a method of testing a negative film and printing a plurality of positives therefrom by varying the effective exposure by mechanical means in a predetermined fashion, so that each section of the film is given the exposure previously found to be appropriate without any intervention of a skilled operator.

More particularly defined the invention comprises means controlled or actuated by the film or its forwarding mechanism for automatically changing the exposure, for example, by changing the intensity of light to which the section of film is subjected upon the commencement of printing a fresh section and therefore a section of different density of the negative film.

A further object of the invention comprises a machine in which is combined prises a machine in which is combined mechanism for rapidly testing the negative film in order to determine the proper exposure which each section requires, and also apparatus for mechanically varying the exposure in the manner found desirable as the film is conducted past the point at which printing takes place.

In more precise terms the apparatus for determining the requisite exposure for a certain section of negative film consists of apparatus for taking a number of prints from a section of the film, a convenient number may be twelve, and of these prints each one is given a different exposure from the rest. The effective exposure is most conveniently varied by altering the brightness of the source of light employed, if this is an electric lamp by inserting resistances in series with it. The mechanism when started automatically forwards a positive film or other sensitive printing surface in twelve steps past the section of negative to be tested, and at each movement automatically varies the resistance in the circuit of the illuminating lamp. The forwarding mechanism is automatically stopped on the completion of the set of prints. The twelve prints are then developed and the best exposure is judged from the result.

More definitely defined the printing apparatus proper for printing complete positive films comprises means for forwarding the negative and positive films together past a suitable source of illumination, and also includes a device controlled or actuated by the film or its forwarding mechanism for altering the exposure, for example by altering the brightness of the source of light as each section which makes up the negative film comes to the point at which printing takes place. In accordance with the invention this device is preferably a rotary drum or disk bearing contact studs which in a particular position of the disk contact with one of a line of brushes connected through different amounts of resistance into the circuit of the electric lamp providing the source of illumination. Each stud is put into an appropriate position to contact with a brush by means of which the appropriate amount of resistance for the particular section of film corresponding to the stud will be inserted into the lamp circuit. This device is rotated, or its rotation controlled, by the traveling film, for instance by means of an escapement actuated electromagnetically by a contact operated by the film which allows the device to turn under the action of a spring.

The invention further consists in the details and combination of parts hereinafter described in relation to the annexed drawings.

In these drawings an embodiment of the invention comprising a combined testing and printing machine is illustrated as follows:—

Figure 1 is a general view of the testing and printing apparatus.

Fig. 2 is a diagram of the electrical circuits involved.

Fig. 3 shows the means of varying exposure during testing.

Figs. 4, 5 and 6 show the mechanism for varying the exposure during printing, in elevation, side elevation and perspective respectively, the record disk being removed in Fig. 6.

Fig. 7 shows the contact device by which the film controls the mechanism of Figs. 4, 5 and 6.

Fig. 11 is an end view and Fig. 12 a longitudinal view of a modified form of film-controlled contact member; and Fig. 13 shows a modified contact device on the film.

Figure 4:
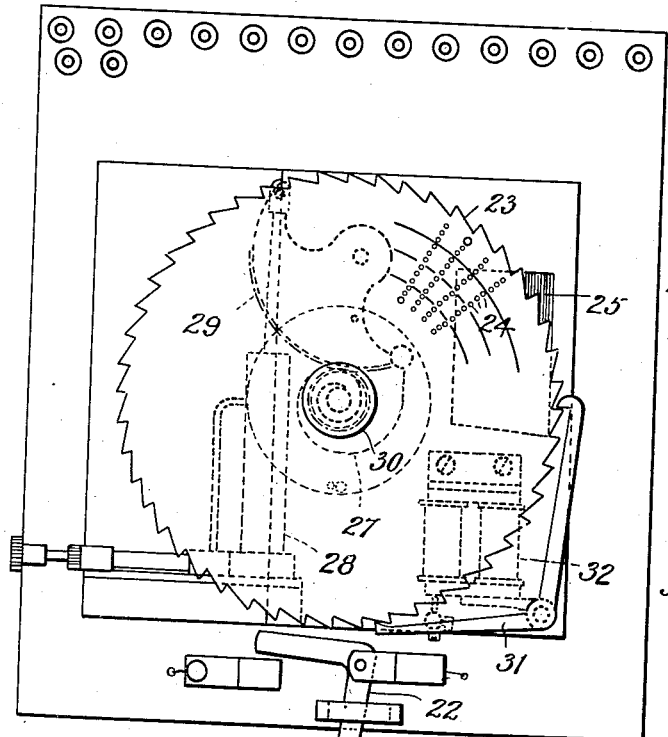
Figure 5:
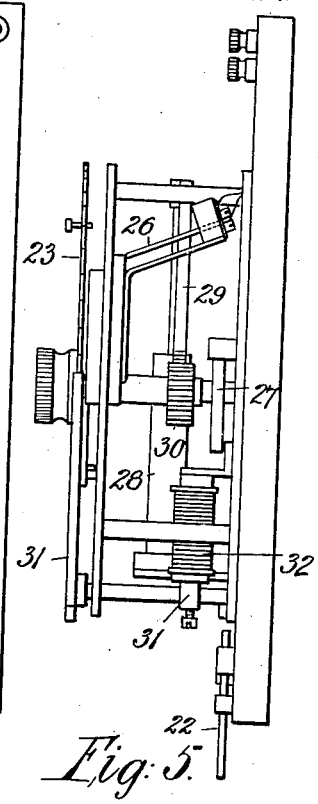

The central part of the testing mechanism is a sunflower switch, consisting of an arm 1 rotating over a circle of contacts 2. Most of these contacts, in this case twelve, are joined to the segments of a resistance 3. A varying portion of this resistance is included by the switch in the circuit of an incandescent arc or other electric lamp 4 which forms the source of light for printing. The arm 1 is driven with the positive film which is forwarded step by step with a section of the negative film past the printing point by any usual mechanism. In Fig. 1 the films are forwarded together through the gate 45 by the arms 46 driven by the gearing shown. The driving shaft for the positive film forwarding mechanism is represented by 5, and carries a loose pulley 6 and a fast pulley 7. Upon this shaft or another geared to it is an eccentric 8, the eccentric rod 9 of which is formed at its end as a pawl engaging a ratchet wheel 10 on the spindle of the arm 1. The pawl is kept engaged with the ratchet wheel by spring 11.

In order that the mechanism may come to rest automatically when the desired number of prints have been taken, the belt shifter 12 by which the belt is moved from the loose to the fast pulley is drawn by a spring 13 toward the loose pulley and has means for retaining it on the fast pulley until a cycle of operations is completed. A rod 14 attached to and reciprocating with the belt shifter has an upstanding catch 15 in position to engage a corresponding catch 16 formed on the armature 17 of an electromagnet 18. The winding of this electromagnet is connected with a source of supply 19 across two end contacts 20 of the sunflower switch 1, 2. These contacts are bridged by the switch arm at the end of its rotation, and consequently the electromagnet is excited and the belt shifter released.

It will be seen that the apparatus thus far described affords a ready means of taking from each section of the negative film twelve prints differing from each other in exposure. These are developed, and compared, and so for each section of film the best exposure is determined; or in other words the best resistance to be put in the lamp circuit during printing from that particular section of film is discovered. It remains to provide for these different resistances being inserted in the circuit at the appropriate times.

The apparatus for printing complete positive films comprises any usual mechanism for forwarding the negative and positive films, together, in steps, past a printing point. A large portion of the mechanism may of course be common to the testing and printing apparatus. So may the lamp 4, which by means of the switches 21, 22 can be removed from the circuit of the sunflower switch 1, 2 and put into the circuit of the contact device next to be described.

Figure 8:
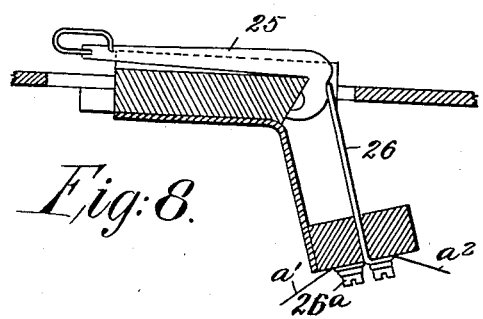
Figs. 8, 9 and 10 are details of the mechanism of Figs. 4, 5 and 6.
Figure 9:
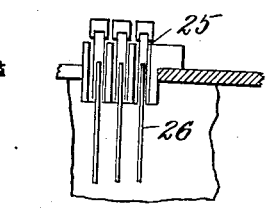
Figure 10:
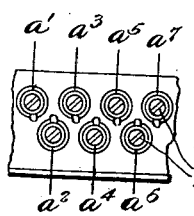

This contact device consists of a disk 23 having ratchet teeth upon it, or a ratchet wheel on its arbor. In the disk are radial rows of perforations 24, threaded to receive contact studs. Adjacent to the disk is a row of brushes 25, each held a short distance from the surface of the disk by its spring 26 through which it is joined to a terminal screw 26ª, in turn connected to one of the tappings 3ª—3ⁿ of the resistance 3 or of a similar rheostat by means of connecting wires a', a²—a⁷. The details of the brushes and their support may be seen from Figs. 8, 9 and 10.

The disk 23 is rotated by a spring 27 upon its arbor, the movement being checked by a regulable dash pot 28 geared to the disk by a toothed segment and pinion 29, 30, while it is controlled by an escapement 31. This escapement is attached to the armature of an electromagnet 32, which is connected across a source of supply 33 through a fixed contact 34 and a contact spring 35. The contact spring rests on one or other of two push rods 36, hinged to a pivoted lever 37, which carries at its end a wheel 38 pressed by the spring 39 upon the edge of the negative film 40. The edge of the film is recessed at intervals corresponding to its sections as at 41.

For each section of negative film there is a row of perforations 24 in the disk 23. A contact stud is inserted in each row in position to engage the brush 25 which will insert in the circuit of the lamp 4 the appropriate amount of resistance for the section of film in question as determined by the testing device just described. On the film being moved, as each recess 41 comes opposite the roller 38 the lever 37 is rocked. The lower rod 36 is withdrawn so that contact is made between the spring 35 and screw 34; then as the wheel 38 rides out of the recess the lower rod is thrust out, breaking contact again. Consequently the disk 23 is permitted to turn so as to bring another row of perforations 24 opposite the line of brushes 25, and so make the desired change in the resistance in the circuit of lamp 4.

In order that the current shall be automatically switched off when there is no film in the gate 47 the continued movement of the roller 38 causes the upper rod 36ᵃ to push outwardly the blade spring 35 and thus break the circuit.

It will be understood that the invention is not limited to the precise mechanism described; for instance the disk 23 could be replaced by a drum 42 (see Figs. 11 and 12), which could be actually rotated by an electromagnet the circuit of which is controlled by the film either in the manner indicated in Fig. 7 or by means of metal clips 43 on the film see Fig. 13 and so forth, lines of contact 44 replacing the radial lines of contact studs placed in the perforations in the disk 23; and this applied equally to both the testing and the printing mechanism.

There are two distinct stages in the operation of the device. The density of the negative film to be printed is first tested. In fact, a separate test has to be made for each section of the negative film comprising the different scenes. The positive film is placed in the gate 45 with a length of negative film to be tested; the switch 21 is closed, and the switch 22 is opened. The belt shifter 14 is moved until the belt is on the fast pulley 7 as shown in Fig. 2, thus connecting the driving mechanism of the feed to the external source of power. By this means the positive and negative films are forwarded as usual together in steps and in unison with the movements of the positive and negative film through the gate 45 the arm 1 is driven by the machine so that one picture is printed while the arm 1 is on each of the contact studs 2. When the arm finally bridges the studs 20, the belt shifter 14 is released and the testing part of the machine comes to rest. The circuit for this testing operation is from one of the main supply wires, through the source of illumination 4, through the switch 21, through the sunflower switch 1, 2, and through a varying number of sections of the rheostat 3 to the opposite main supply wire. By this means twelve successive exposures are made with increasing light from the source 4. When the strip of positive film is developed it is easy to recognize at once which picture has received the correct exposure. This is repeated for all the sections of negative film of different density, and the exposures so determined are given to each section of negative film, when that section is printed in the following manner.

The negative and positive films are passed through the gate 45 in the ordinary way for printing and the contact disk 23 is supplied with studs so that as each radial row of studs contacts with the brushes 25 the necessary sections of the rheostat 3 for giving successive scenes in the film the correct exposure are inserted in the circuit of the lamp 4. The switch 21 is therefore opened and the switch 22 closed, and the machine again started. When the end of the section of film is reached the notch 41 enables the disk 23 to be rotated one step and the correct sections of the resistance 3 are switched in for the next section of film and so on. During the printing operation the following is the circuit: From one of the main supply wires, through the lamp 4, switch 22, disk 23, a stud in one of the perforations 24, one of the brushes 25, one of the wires $a'$—$a^7$, through the requiste number of sections of the rheostat 3, back to the other main supply wire. By this means each section of positive film corresponding to a particular section of negative film obtains its correct exposure.

What I claim is:

1. A machine for testing the density of and for printing from a negative film to produce a plurality of substantially perfect and identical positives, consisting in the combination of a variable source of illumination, means for forwarding the negative film and the positive film through the machine, means in operative connection with said forwarding means for mechanically varying the source of illumination at each step during testing and mechanism operated by the negative film during printing for insuring that each section of negative film shall receive the appropriate illumination during this period.

2. In apparatus for rapidly determining a suitable exposure for printing a section of film, the combination of step by step mechanism for forwarding a positive film and the section of negative film to be tested past an aperture gate, means for effecting an exposure through said aperture after each forwarding movement, means for mechanically varying the effect of said exposure at each step, and means for disconnecting the drive to said forwarding mechanism and said exposing means after the completion of a predetermined number of exposures.

3. In apparatus for printing from a negative film, the combination of a source of illumination for said film of variable intensity, a rotary device adapted to vary the intensity of said source of illumination as it turns, and means controlled in accordance with the forward motion of the film for turning the rotary device step by step as a fresh section of film passes the printing point.

4. In apparatus for testing the density of a negative film, the combination of means for forwarding a positive film in step by step fashion together with a section of negative film, means for illuminating said section of negative film, a clutch device adapted to put said driving means into operation, spring means tending to withdraw said clutch device, a catch holding said clutch device in the operative position against the action of said spring, a sunflower switch driven by the film driving means, a rheostat connected in the circuit of the source of illumination with its sections connected to the contacts of said sunflower switch, and electromagnetic means brought into action at the end of the range of movement of said sunflower switch in order to release the retaining catch of said clutch device.

5. In a film testing and printing apparatus, means for rapidly testing the density of the sections of a film, a selector device, a source of illumination for printing, means for varying the intensity of said source in operative connection with said selector device, and means controlled in accordance with the forward motion of the film acting upon said selector device so that as a fresh section of film passes the printing point said selector device suitably varies the intensity of the printing illumination.

6. In a film printing apparatus, the combination of means for forwarding a positive and negative film together in steps past a printing point, a source of light illuminating said printing point, a rotating contact making device included in the circuit of the source of light, means controlled in accordance with the forward motion of the film for controlling the rotation of said contact making device, a rheostat provided with tappings, contacts in connection with said tappings, and contact studs attachable to said rotating contact making device to be moved in the path in order to contact with appropriate members of said contacts connected to the rheostat tappings.

7. Apparatus for determining the necessary exposure for a section of film, consisting in combination of a film printing machine, an electric lamp for providing illumination for said machine, a definite source of electric supply for said lamp, a rheostat, and a mechanically operated switch for inserting desired portions of said rheostat in series with said lamp and said source of supply after each exposure.

8. In a machine for printing a negative film, the combination of mechanism for forwarding said negative film together with a positive film in step by step fashion before an exposure aperture, a source of illumination for exposing said film through said aperture, a shutter in said aperture controlling the exposure of said film, electrical means operative upon said source of illumination for varying the effective exposure upon said film, a series of contact brushes in the circuit of said electric means, a detachable rotary perforated metallic disk capable of moving so that its perforations pass in proximity to said contact brushes, and a series of contact studs for insertion in said perforations in order to co-act with said contact brushes and produce the necessary alterations in said electric circuit as said contact disk rotates.

In testimony whereof I have signed my name to this specification.

A. C. REMINGTON.